(12) United States Patent
Yagi et al.

(10) Patent No.: US 8,584,657 B2
(45) Date of Patent: Nov. 19, 2013

(54) FUEL SUPPLY APPARATUS AND FUEL SUPPLY METHOD

(75) Inventors: Yukio Yagi, Osaka (JP); I Hon Tyun, Osaka (JP); Yuuki Ootomo, Osaka (JP)

(73) Assignee: Yanmar Co., Ltd. (JP)

( * ) Notice: Subject to any disclaimer, the term of this patent is extended or adjusted under 35 U.S.C. 154(b) by 536 days.

(21) Appl. No.: 12/742,410

(22) PCT Filed: Nov. 13, 2008

(86) PCT No.: PCT/JP2008/070663
§ 371 (c)(1),
(2), (4) Date: Apr. 1, 2011

(87) PCT Pub. No.: WO2009/063933
PCT Pub. Date: May 22, 2009

(65) Prior Publication Data
US 2011/0168137 A1    Jul. 14, 2011

(30) Foreign Application Priority Data
Nov. 15, 2007   (JP) .................................. 2007-297038

(51) Int. Cl.
*F02B 13/00*   (2006.01)

(52) U.S. Cl.
USPC .......................................... 123/575; 123/1 A (58) Field of Classification Search
USPC ................... 123/1 A, 381, 575–578
See application file for complete search history.

(56) References Cited

U.S. PATENT DOCUMENTS

| 4,471,744 A | 9/1984 | Holtz |
| 5,117,800 A | 6/1992 | Watson et al. |
| 5,979,420 A * | 11/1999 | Kawamura ..................... 123/557 |
| 8,006,677 B2 * | 8/2011 | Williams et al. .............. 123/575 |
| 2006/0090727 A1 * | 5/2006 | Weissman et al. ............ 123/295 |

FOREIGN PATENT DOCUMENTS

| JP | 56086992 A * | 7/1981 | ................ C10L 1/04 |
| JP | 57-97061 A | 6/1982 | |
| JP | 59-90734 A | 5/1984 | |
| JP | 61-48961 U | 4/1986 | |
| JP | 62158917 A * | 7/1987 | ................ F23K 5/00 |
| JP | 63-50658 A | 3/1988 | |

(Continued)

OTHER PUBLICATIONS

"International Application Serial No. PCT/JP2008/070664, International Preliminary Report on Patentability dated Feb. 9, 2010", (w/ English Translation), 14 pgs.

(Continued)

*Primary Examiner* — Stephen K Cronin
*Assistant Examiner* — Joseph Dallo
(74) *Attorney, Agent, or Firm* — Schwegman, Lundberg & Woessner, P.A.

(57) ABSTRACT

Mixture ratios of fuel oils, which are arbitrarily combined and mixed to generate an oil mixture, are set to be mixture ratios that satisfy a predetermined viscosity condition. Based on the mixture ratios, a CPU (49) generates an oil mixture by controlling flow regulating valves (23, 24) in a blender (13). When the oil mixture is supplied to the engine (14) as a pressurizing pump (32) operates, the viscosity is detected by a viscometer (33). The CPU (49) adjusts the mixture ratios based on the detection result, such that the viscosity of the oil mixture satisfies the viscosity condition and that the content of a fuel oil having the highest viscosity among the fuel oils in the oil mixture is maximized.

13 Claims, 4 Drawing Sheets

(56) References Cited

FOREIGN PATENT DOCUMENTS

| | | |
|---|---|---|
| JP | 63-112266 A | 5/1988 |
| JP | 63-112266 U | 7/1988 |
| JP | 03-503196 | 7/1991 |
| JP | 5-61450 U | 8/1993 |
| JP | 05-61450 B | 9/1993 |
| JP | 2000-34959 A | 2/2000 |
| JP | 2001-214822 A | 8/2001 |
| JP | 2002-168139 A | 6/2002 |
| JP | 2002-1168139 A | 6/2002 |
| JP | 2005-127279 A | 5/2005 |

OTHER PUBLICATIONS

"International Application Serial No. PCT/JP2008/070664, International Search Report mailed Dec. 16, 2008", 2 pgs.

"International Application Serial No. PCT/JP2008/070664, Written Opinion mailed Dec. 16, 2008", 4 pgs.

"International Application Serial No. PCT/JP2008/070663, International Search Report mailed Dec. 9, 2008", 2 pgs.

"International Application Serial No. PCT/JP2008/070663, International Preliminary Report on Patentability issued Jun. 29, 2010", (w/ English Translation of Written Opinion), 7 pgs.

* cited by examiner

FUEL SUPPLY APPARATUS AND FUEL SUPPLY METHOD

CROSS REFERENCE TO RELATED APPLICATIONS

This application is a nationalization under 35 U.S.C. 371 of PCT/JP2008/070663, filed Nov. 13, 2008 and published as WO 2009/063933 A1 on May 22, 2009, which application claims priority to and the benefit of Japanese Patent Application No. 2007-297038, filed Nov. 15, 2007; each of which applications and publication are incorporated herein by reference in their entirety, and the priority of each of which is claimed herein.

TECHNICAL FIELD

The present invention relates to a fuel supply apparatus and a fuel supply method for supplying as fuel an oil mixture made by mixing various types of oils.

BACKGROUND

In recent years, the increase in performance of diesel engines has enabled oil mixture to be used as fuel other than light oils or heavy oils, which are used alone. The oil mixture refers to a type of oil made by mixing multiple types of oils having different viscosities. Accordingly, inexpensive low-quality oil having a viscosity higher than that of high-quality oil such as light oil has been selected as a material of the oil mixture. This reduces fuel costs.

For such an oil mixture, not only oils having low viscosities, but also oils having high viscosities are used as materials, taking into consideration the prices of the fuels. To use oil mixture as fuel, the viscosity of the oil mixture itself is adjusted. For example, Patent Document 1 discloses a fuel supply apparatus for supplying oil mixture as described above to an engine. In this fuel supply apparatus, the viscosity of oil mixture, which has been generated by mixing various oils, is detected in a supply passage for supplying the oil mixture to an engine. Based on the detection result, the oil mixture is heated in the supply passage leading to the engine to adjust the viscosity of the oil mixture, such that the viscosity becomes appropriate for use in a diesel engine.

However, in the above fuel supply apparatus, the oils constituting the oil mixture can include components that can be oxidized and degraded by heating the oil mixture to adjust the viscosity. Particularly, in recent years, biodiesel fuel, which is obtained by refining plant-derived oil and waste edible oil, has received a lot of attention as a circulation type energy. Use of oil mixture obtained by mixing these oils with light oil or heavy oil has been proposed. However, in general, biodiesel fuel is easily oxidized and degraded by heat. Therefore, use of such an oil mixture as fuel can cause problems such as a lowered fuel efficiency.

Patent Document 1: Japanese Laid-Open Patent Publication No. 2005-127279

OVERVIEW

Accordingly, it is an objective of the present invention to provide a fuel supply apparatus and a fuel supply method that keep the viscosity of fuel in a predetermined range, while suppressing degradation of the fuel due to oxidation and reducing fuel supply costs.

To achieve the foregoing objective and in accordance with a first aspect of the present invention, a fuel supply apparatus is provided that includes mixture ratio setting means, mixing means, viscosity detecting means, and adjusting means. The mixture ratio setting means sets mixture ratios of fuel oils, which are arbitrarily combined and mixed to generate an oil mixture, in accordance with a predetermined viscosity condition. The mixing means mixes the plurality of types of fuel oils based on the mixture ratio set by the mixture ratio setting means, thereby generating the oil mixture. The viscosity detecting means detects a viscosity of the oil mixture generated by the mixing means. The adjusting means adjusts the mixture ratios of the fuel oils in the oil mixture that have been set by the mixture ratio setting means based on a detection result of the viscosity detecting means, such that the viscosity of the oil mixture satisfies the viscosity condition and that the content of a fuel oil having the highest viscosity among the fuel oils in the oil mixture is maximized.

In accordance with this configuration, the viscosity can be adjusted to satisfy the predetermined viscosity condition without heating the oil mixture. Also, since the mixture ratios of the fuel oils in the oil mixture are adjusted to maximize the content ratio of the high viscosity fuel oil, it is possible to maximize the use of the high viscosity fuel oil, which is generally considered to be advantageous in cost, for example, in the fuel prices and the amount of carbon dioxide emissions. That is, it is possible to keep the viscosity of the fuel in a range of the predetermined viscosity condition, while suppressing degradation of the fuel due to oxidation and reducing the fuel supply costs.

The fuel supply apparatus preferably further includes temperature detecting means and memory means. The temperature detecting means detects a temperature of each fuel oil prior to the generation of the oil mixture. The memory means stores one or more fuel maps each defining the relationship between a viscosity of the oil mixture and mixture ratios of the fuel oils at each of different temperatures of the oil mixture. The mixture ratio setting means sets the mixture ratios of the fuel oils in the oil mixture based on the detection result of the temperature detecting means and the fuel maps stored in the memory means.

In accordance with this configuration, it is possible to compute mixture ratios of the fuel oils that satisfy the predetermined viscosity condition of the oil mixture based on the fuel maps.

The one or more fuel maps stored in the memory means preferably include a plurality of types of fuel maps each corresponding to a different combination of the fuel oils that are mixed to generate an oil mixture satisfying the viscosity condition. The memory means preferably further stores a reference map that defines the relationship between mixture ratios and fuel supply costs for a combination of the fuel oils corresponding to the fuel maps.

In accordance with this configuration, an optimal combination can be selected from a number of combinations of the fuel oils by computing the fuel supply costs of the oil mixture of the mixture ratios of the fuel oils computed based on the fuel maps, while referring to the reference map.

The fuel supply apparatus preferably further includes a drive source and circulating means. The drive source receives oil mixture as fuel from the mixing means through a supply passage. The circulating means is located in the supply passage and between the mixing means and the drive source, and circulates some of the oil mixture supplied to the drive source to an upstream part of the supply passage. The adjusting means adjusts the mixture ratios of the oil mixture based on a viscosity of the oil mixture detected by the viscosity detecting means after the drive source is started.

In accordance with this configuration, since the circulating means circulates the oil mixture that has been heated by the exhaust heat of the drive source such as an engine, the oil mixture supplied to the drive source is heated further. This raises the content ratio of the high viscosity fuel oil among the fuel oils in the oil mixture.

The fuel supply apparatus preferably further includes a plurality of fuel tanks each storing different one of the fuel oils, and flow regulating means located between the fuel tanks and the oil mixture generating means. The flow regulating means regulates the flow rate of each fuel oil so as to supply the plurality of types of fuel oils to the mixing means, and controls the mixture ratios of the oil mixture.

In accordance with this configuration, the mixture ratios of the oil mixture can be controlled with a simple structure, by adjusting the flow rate of the fuel oils.

In accordance with a second aspect of the present invention, a fuel supply method using a fuel supply apparatus is provided. The method includes: a mixture ratio setting step for setting mixture ratios of fuel oils, which are arbitrarily combined and mixed to generate an oil mixture, in accordance with a predetermined viscosity condition; an oil mixture generating step for mixing the plurality of types of fuel oils based on the mixture ratio set in the mixture ratio setting step, thereby generating the oil mixture; viscosity detecting step for detecting a viscosity of the oil mixture generated in the mixing step; and adjusting step for adjusting the mixture ratios of the fuel oils in the oil mixture that have been set in the mixture ratio setting step based on a detection result of the viscosity detecting step, such that the viscosity of the oil mixture satisfies the viscosity condition and that the content of the fuel oil having the highest viscosity among the fuel oils in the oil mixture is maximized.

In accordance with this configuration, the same advantages as those of the above fuel supply apparatus are achieved.

DETAILED DESCRIPTION OF THE PREFERRED EMBODIMENTS

One embodiment of the present invention will now be described with reference to the drawings.

Figure 1:
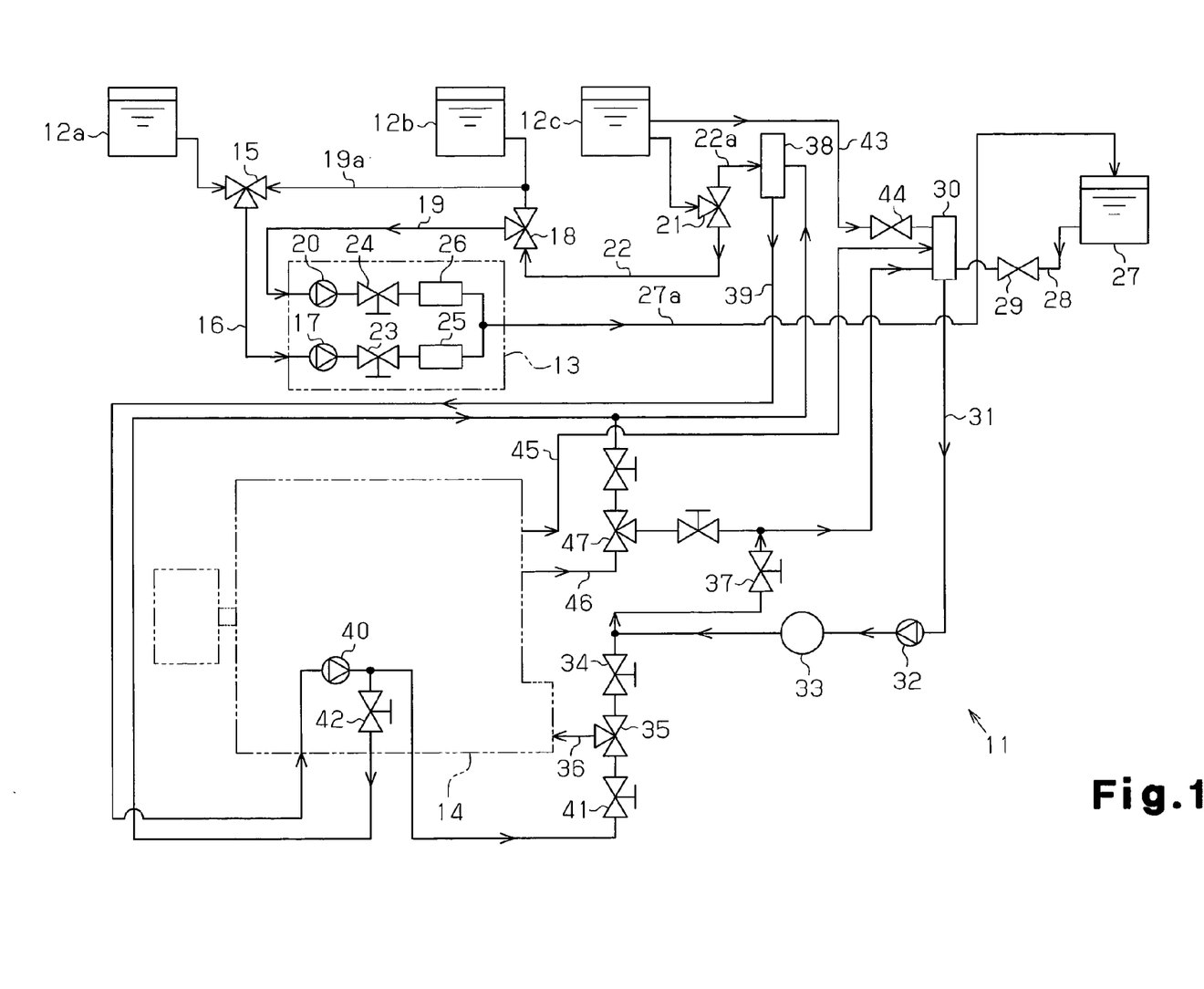
FIG. 1 is a system diagram schematically showing a fuel supply apparatus according to one embodiment of the present invention.

As shown in FIG. 1, a fuel supply apparatus 11 according to the present embodiment includes first to third fuel tanks 12a, 12b, 12c, a blender 13, and an engine 14 serving as a drive source. The first to third fuel tanks 12a, 12b, 12c store, as fuel oils, a vegetable oil, a fatty acid methyl ester, and an A heavy oil, respectively. The blender 13 functions as mixing means for mixing fuel oils sent from the fuel tanks 12a, 12b, 12c. The engine 14 receives and is driven by the oil mixture mixed by the blender 13. Among the fuel oils, the vegetable oil stored in the first fuel tank 12a and the fatty acid methyl ester stored in the second fuel tank 12b are non-heat resistant fuel oils, while the A heavy oil stored in the third fuel tank 12c is a heat resistant fuel oil. The non-heat resistant fuel oil refers to a fuel oil that is highly likely to be oxidized and degraded when directly heated, while the heat resistant fuel oil refers to a fuel oil that is unlikely to be oxidized and degraded when directly heated.

First, a piping structure for supplying fuel oils from the fuel tanks 12a, 12b, 12c to the blender 13 will be described.

An upstream end of a supply passage 16 is connected to the first fuel tank 12a, which stores vegetable oil, and a downstream end of the supply passage 16 is located inside the blender 13. An electromagnetic type first three-way valve 15 is provided in the supply passage 16. A first pressurizing pump 17 is located in a part of the supply passage 16 that is located inside the blender 13. The first pressurizing pump 17 functions as a fuel feed pump. Thus, when the first three-way valve 15 of the supply passage 16 connects the first fuel tank 12a and the blender 13 to each other, the vegetable oil in the first fuel tank 12a is sent to the blender 13 through the supply passage 16 while being pressurized by the operation of the first pressurizing pump 17.

An upstream end of a supply passage 19 is connected to the second fuel tank 12b, which stores fatty acid methyl ester, and a downstream end of the supply passage 19 is located inside the blender 13. An electromagnetic type second three-way valve 18 is provided in the supply passage 19. A second pressurizing pump 20 is located in a part of the supply passage 19 that is located inside the blender 13. The second pressurizing pump 20 functions as a fuel feed pump. A branch supply passage 19a branches off a part of the supply passage 19 between the second fuel tank 12b and the second three-way valve 18. The branch supply passage 19a is connected to the supply passage 16 with the first three-way valve 15.

Therefore, when the first three-way valve 15 of the supply passage 16 connects the second fuel tank 12b and the blender 13 to each other, and the second three-way valve 18 of the supply passage 19 disconnects the second fuel tank 12b and the blender 13 from each other, the fatty methyl ester in the second fuel tank 12b is sent to the blender 13 through the branch supply passage 19a and the supply passage 16 while being pressurized by the operation of the first pressurizing pump 17. On the other hand, when the first three-way valve 15 of the supply passage 16 disconnects the second fuel tank 12b and the blender 13 from each other, and the second three-way valve 18 of the supply passage 19 connects the second fuel tank 12b and the blender 13 to each other, the fatty methyl ester in the second fuel tank 12b is sent to the blender 13 through the supply passage 19 while being pressurized by the operation of the second pressurizing pump 20.

An upstream end of a supply passage 22 is connected to the third fuel tank 12c, which stores A heavy oil, and a downstream end of the supply passage 22 is connected to the supply passage 19 with the second three-way valve 18 provided on the supply passage 19. An electromagnetic type third three-way valve 21 is provided in the supply passage 22. Thus, when the third three-way valve 21 of the supply passage 22 and the second three-way valve 18 of the supply passage 19 connect the third fuel tank 12c and the blender 13 to each other, the A heavy oil in the third fuel tank 12c is sent to the blender 13 through the supply passage 22 and the supply passage 19 while being pressurized by the operation of the second pressurizing pump 20. The fuel tanks 12a to 12c and the blender 13 are connected by the above described piping structure. Therefore, three types of fuel oils (vegetable oil, fatty acid methyl ester, A heavy oil), which are stored in the fuel tanks 12a to 12c, respectively, can be mixed in the blender 13 in a desired combination by switching the states of the three-way valves 15, 18, 21.

The piping structure for supplying fuel oil to the engine 14 will now be described.

An upstream end of a supply passage 28 is connected to an outlet of the oil mixture tank 27, which stores oil mixture, and a downstream end of the supply passage 28 is connected to a first return chamber 30. The first return chamber 30 functions as circulating means for circulating some of the oil mixture with the engine 14. A first on-off valve 29 is provided on a part of the supply passage 28 between the oil mixture tank 27 and the first return chamber 30.

An upstream end of a supply passage 31 is connected to an outlet of the first return chamber 30. A third pressurizing pump 32 and a viscometer 33 are provided on the supply passage 31. The third pressurizing pump 32 supplies the oil mixture to the downstream side, and the viscometer 33 functions as viscosity detecting means for detecting the viscosity of the oil mixture. The downstream portion of the supply passage 31 is bifurcated. One of the bifurcated portions is connected to an upstream end of a supply passage 36, which is connected to a fuel port of the engine 14 with a second on-off valve 34 and an electromagnetic type fourth three-way valve 35. The other one of the bifurcation is connected to an inlet of the first return chamber 30 with a third on-off valve 37.

Therefore, when the first on-off valve 29, the second on-off valve 34, and the fourth three-way valve 35 connect the oil mixture tank 27 and the engine 14 to each other, and third on-off valve 37 is closed, the oil mixture stored in the oil mixture tank 27 is sent to the supply passage 31 while being pressurized by the operation of the third pressurizing pump 32. The oil mixture is then supplied to the engine 14 through the supply passage 31 and the supply passage 36. Some of the oil mixture to be supplied to the engine 14 is returned to the first return chamber 30 by opening the third on-off valve 37 as necessary. In this manner, the oil mixture is supplied while being circulated.

The supply passage 22, the upstream end of which is connected to the third fuel tank 12c storing A heavy oil, is connected to an inlet of a second return chamber 38 with the third three-way valve 21 and a branch supply passage 22a. The second return chamber 38 functions as circuiting means when circulating and supplying the A heavy oil, as well as temporary storing means when supplying only the A heavy oil to the engine 14. An upstream end of a supply passage 39 is connected to the outlet of the second return chamber 38. A fourth pressurizing pump 40 is provided on the supply passage 39. The fourth pressurizing pump 40 supplies the A heavy oil to the downstream side. A downstream portion of the supply passage 39 is bifurcated. One of the bifurcated portions is connected to the fourth three-way valve 35 with a fourth on-off valve 41, and is connected to the upstream end of the supply passage 36, which communicates with the fuel port of the engine 14 with the fourth three-way valve 35. The other one of the bifurcation is connected to an inlet of the second return chamber 38 with a fifth on-off valve 42.

The operation for directly supplying the A heavy oil to the engine 14 will now be described. For example, if the viscosity of oil mixture is significantly high at the start of the operation of the fuel supply apparatus 11 due to, for example, a low external temperature, the oil mixture cannot be used as fuel.

In this case, the fourth pressurizing pump 40 is operated so as to supply the A heavy oil, which has an improved starting performance. The operation of the fourth pressurizing pump 40 sends the A heavy oil stored in the third fuel tank 12c to the supply passage 39, while being pressurized. The A heavy oil is then supplied to the engine 14 through the supply passage 39 and the supply passage 36. Accordingly, it is possible to supply only the A heavy oil to the engine. Some of the A heavy oil to be supplied to the engine 14 is returned to the second return chamber 38 by selectively closing and opening as necessary the on-off valves 41, 42 provided in the bifurcated portions in the downstream portion of the supply passage 39. In this manner, the A heavy oil is supplied to the engine 14 while being circulated between the second return chamber 38 and the engine 14.

The third fuel tank 12c, which stores the A heavy oil, is connected to the first return chamber 30, which circulates the oil mixture, with a supply passage 43 and a sixth on-off valve 44. When the sixth on-off valve 44 on the supply passage 43 is open, the A heavy oil is added to the oil mixture circulated through the first return chamber 30. This allows the mixture ratio of the A heavy oil in the oil mixture to be increased.

The supply passage 36 for supplying the oil mixture or the A heavy oil to the fuel port of the engine 14 is bifurcated into a supply passage 45 and a supply passage 46 with a switching valve (not shown) inside the engine 14. The supply passage 45 is connected to the first return chamber 30, which functions as temporary storing means when circulating and supplying the oil mixture. The supply passage 46 is further bifurcated with a fifth three-way valve 47, which is an electromagnetic type. One of the bifurcated portions is connected to the first return chamber 30, which functions as temporary storing means when circulating and supplying the oil mixture. The other bifurcation is connected to the second return chamber 38, which functions as temporary storing means when circulating and supplying the A heavy oil.

Therefore, when the oil mixture is supplied to the engine 14, some of the supplied oil mixture is sent to the first return chamber 30 through the supply passage 45, so as to be mixed with the oil mixture supplied from the oil mixture tank 27. Likewise, when only the A heavy oil is supplied to the engine 14, some of the supplied A heavy oil is sent to the second return chamber 38 through the supply passage 46, so as to be mixed with the A heavy oil supplied from the third fuel tank 12c. Further, the A heavy oil that has been supplied alone to the engine 14 can be mixed with the oil mixture in the first return chamber 30 by switching the communication state of the fifth three-way valve 47 as necessary.

The control configuration of the fuel supply apparatus 11 of the present embodiment will now be described.

Figure 2:
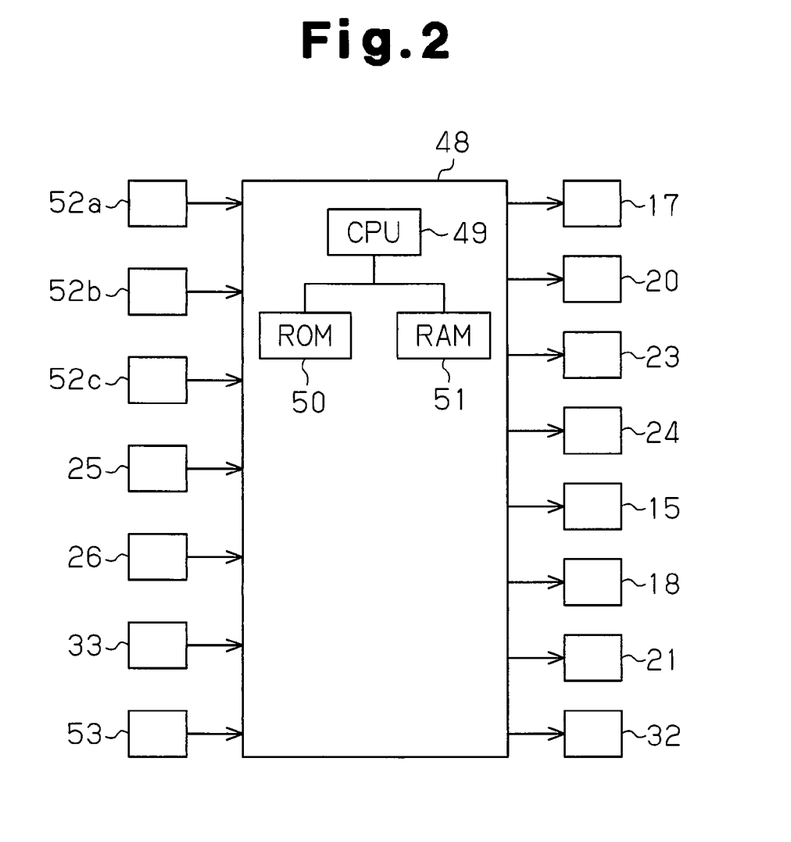
FIG. 2 is a block diagram illustrating a control device according to the embodiment of the present invention.

As shown in FIG. 2, the fuel supply apparatus 11 includes a control device 48 that controls the apparatus 11. The control device 48 is constituted mainly by a controller having a CPU 49 functioning as control means, a ROM 50, and a RAM 51, and a drive circuit (not shown), which drives various devices (such as the on-off valves and the pressurizing pumps). The ROM 50, which functions as memory means, stores fuel maps (see FIG. 3) defining the relationship between the viscosity of the oil mixture and the mixture ratios of the fuel oils at different temperatures of each fuel oil (vegetable oil, fatty acid methyl ester, A heavy oil). The fuel maps include various types of fuel maps defined by combinations of different fuel oils. Further, the ROM 50 stores reference maps (not shown) of various types each corresponding to one of the fuel maps. Each reference map represents the relationship between the mixture ratios and the fuel prices for each combination of the fuel oils. The RAM 51 stores various types of information, which is rewritten as necessary during the operation of the fuel supply apparatus 11.

An input interface (not shown) of the control device 48 is connected to first to third temperature sensors 52a, 52b, 52c, which are temperature detecting means located in the fuel tanks 12a, 12b, 12c, the first and second flow meters 25, 26 for measuring the flow rate of fuel oils mixed in the blender 13, and a process input device 53. The input device 53, which functions as mixture ratio setting means, sets the viscosity condition of the oil mixture and the initial values of the mixture ratios of the fuel oils of the oil mixture prior to the generation of the oil mixture. The control device 48 receives signals from the first to third temperature sensors 52a, 52b, 52c, the first and second flow meters 25, 26, the viscometer 33, and the input device 53.

On the other hand, the output interface (not shown) of the control device 48 is connected to the third pressurizing pump 32, which supplies oil mixture, the first and second pressurizing pumps 17, 20 provided in the blender 13, the first and second flow regulating valves 23, 24, and the first to third three-way valves 15, 18, 21 located upstream of the blender 13. The heat exchanger 54 is provided to individually heat the A heavy oil before mixing the fuel oils. The control device 48 separately controls the heat exchanger 54, the first to third pressurizing pumps 17, 20, 32, the first and second flow regulating valves 23, 24, and the first to third three-way valves 15, 18, 21 based on signals from the first to fourth temperature sensors 52a, 52b, 52c, 55, the first and second flow meters 25, 26, the viscometer 33, and the input device 53. Accordingly, the temperature of the oil mixture mixed in the blender 13, the combination of the fuel oils in the oil mixture, and the mixture ratio of each fuel oil are controlled.

Next, the fuel maps stored in the ROM 50 will now be described with reference to FIG. 3.

Figure 3A:
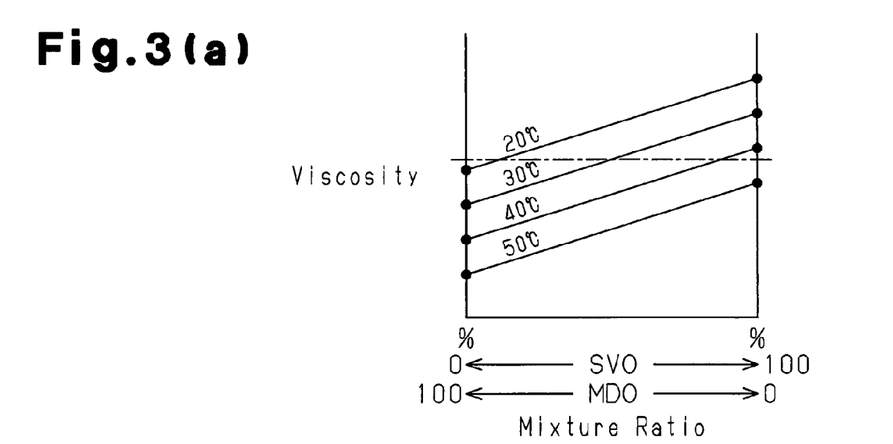
FIG. 3(a) is a fuel map showing the correspondence relationship among the mixture ratio of a vegetable oil and an A heavy oil, the viscosity of the oil mixture, and the temperature of the oil mixture.

The map shown in FIG. 3(a) is a fuel map of an oil mixture that is generated by mixing vegetable oil (labeled as SVO in the drawing) and A heavy oil (labeled as MDO in the drawing). In this map, the higher the temperature of the oil mixture, the lower the viscosity of the oil mixture becomes. Also, the higher the mixture ratio of the vegetable oil (SVO) in the oil mixture, the higher the viscosity of the oil mixture becomes. The ROM 50 stores a reference map (not shown) corresponding to the fuel map shown in FIG. 3(a), which reference map defines the relationship between the mixture ratios and the fuel prices in the combination of the vegetable oil (SVO) and the A heavy oil (MDO).

Figure 3B:
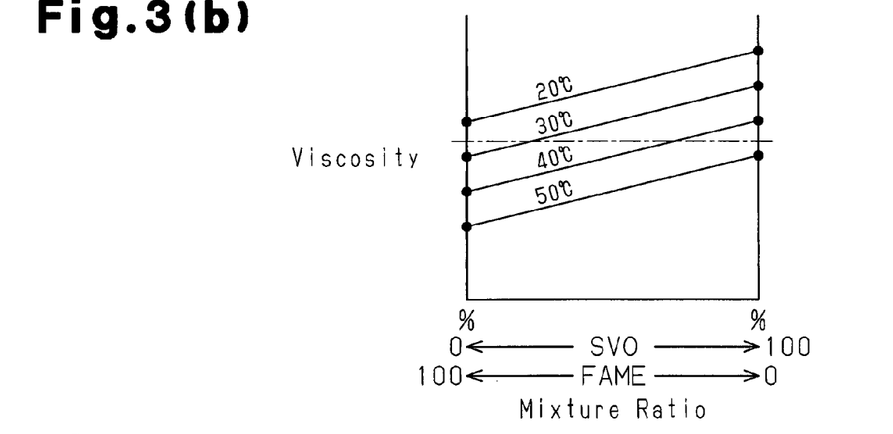
FIG. 3(b) is a fuel map showing the correspondence relationship among the mixture ratio of the vegetable oil and a fatty acid methyl ester, the viscosity of the oil mixture, and the temperature of the oil mixture.

The map of FIG. 3(b) is a fuel map of an oil mixture that is generated by mixing fatty acid methyl ester (FAME) and the A heavy oil (MDO). In this map, the higher the temperature of the oil mixture, the lower the viscosity of the oil mixture becomes. Also, the higher the mixture ratio of the fatty acid methyl ester in the oil mixture, the higher the viscosity of the oil mixture becomes. The ROM 50 stores a reference map (not shown) corresponding to the fuel map shown in FIG. 3(b), which reference map defines the relationship between the mixture ratios and the fuel prices in the combination of the vegetable oil (SVO) and the fatty acid methyl ester (FAME).

Figure 3C:
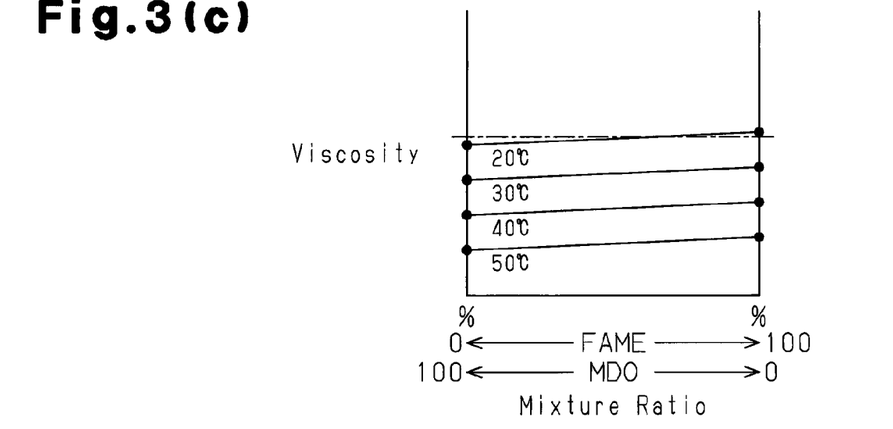
FIG. 3(c) is a fuel map showing the correspondence relationship among the mixture ratio of the fatty acid methyl ester and the A heavy oil, the viscosity of the oil mixture, and the temperature of the oil mixture.

The map of FIG. 3(c) is a fuel map of an oil mixture that is generated by mixing fatty acid methyl ester (FAME) and the A heavy oil (MDO). In this map, the higher the temperature of the oil mixture, the lower the viscosity of the oil mixture becomes. Also, the higher the mixture ratio of the fatty acid methyl ester in the oil mixture, the higher the viscosity of the oil mixture becomes. The ROM 50 stores a reference map (not shown) corresponding to the fuel map shown in FIG. 3(c), which reference map defines the relationship between the mixture ratios and the fuel prices in the combination of the fatty acid methyl ester (FAME) and the A heavy oil (MDO).

Figure 4:
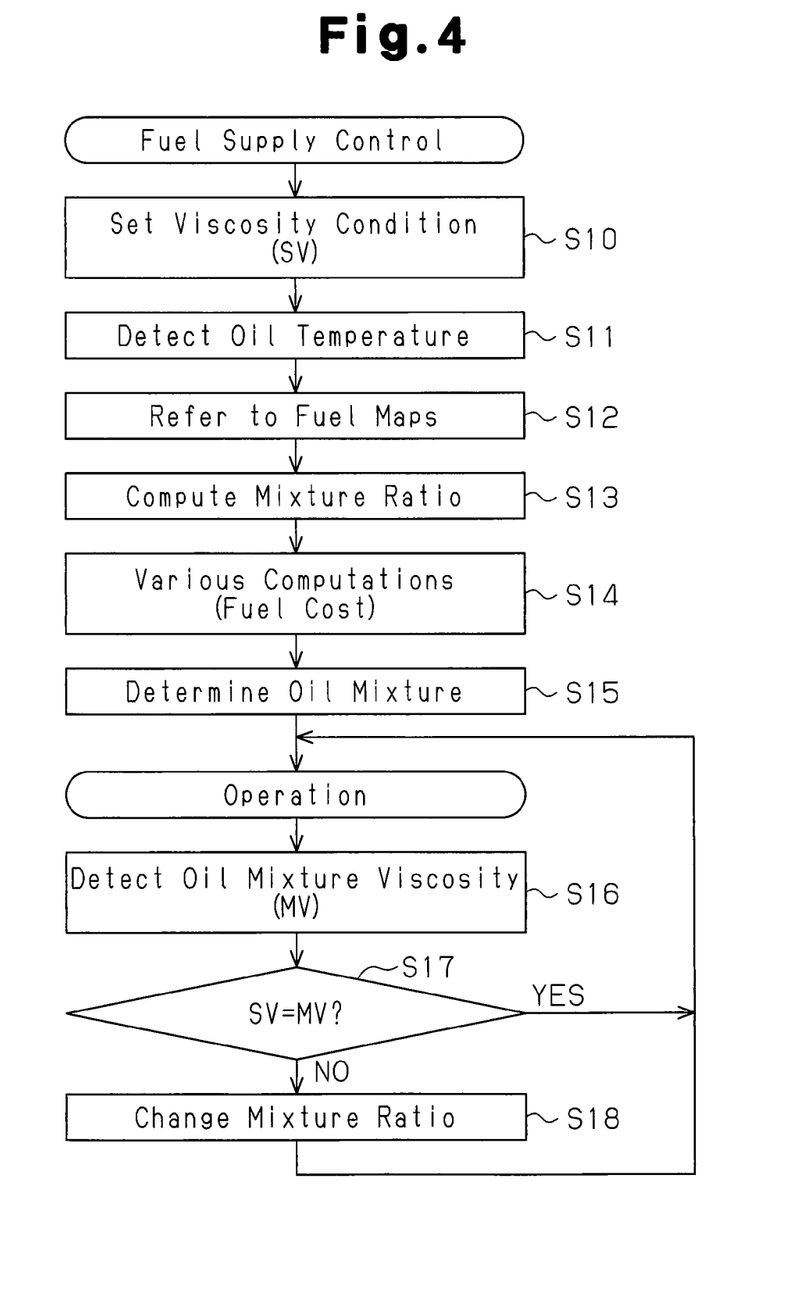
FIG. 4 is a flowchart showing a fuel supply control processing routine.

Next, among the control processing routines executed by the CPU 49 of the present embodiment, a fuel supply control processing routine will be described with reference to FIG. 4.

The CPU 49 first sets a viscosity condition (SV) of the oil mixture based on a signal sent from the input device 53 (step S10). Specifically, the CPU 49 sets a viscosity of the oil mixture appropriate for use in the engine 14 of the present embodiment.

Subsequently, the CPU 49 detects the temperature of each fuel oil based on signals sent from the first to third temperature sensors 52a, 52b, 52c provided in the fuel tanks 12a, 12b, 12c, respectively. The CPU 49 temporarily stores the detected temperatures of the fuel oils in the RAM 51 (step S11).

Next, the CPU 49 simultaneously reads out a plurality of types of fuel maps of different combinations of the fuel oils from the ROM 50. Specifically, as shown in FIGS. 3(a) to 3(c), the CPU 49 reads fuel maps that show the relationships between the viscosity of the oil mixture to be generated by mixing the fuel oils and the mixture ratios of the fuel oils for each temperature of the oil mixture. The RAM 51 temporarily stores the read fuel map.

Subsequently, the CPU 49 computes mixture ratios of the fuel oils that satisfy the viscosity condition (SV) of the oil mixture set in step S10 by referring to the fuel maps read in step S12. Specifically, the CPU 49 first computes the oil temperature of the oil mixture generated by mixing the fuel oils, based on the temperatures of the fuel oils detected at step S11. Then, the CPU 49 selects graphs that correspond to the computed temperature of the oil mixture on the fuel maps. Thereafter, the CPU 49 computes mixture ratios of the fuel oils that satisfy the viscosity condition (SV) of the oil mixture set in step S10 and maximizes the content of the fuel oil having the highest viscosity among the mixed fuel oils. For example, in the case where the vegetable oil (SVO) and the A heavy oil (MDO) are mixed, the CPU 49 computes the mixture ratios of the fuel oils such that the content of the vegetable oil (SVO), which has the higher viscosity, is maximized. In the case where the vegetable oil (SVO) and the fatty acid methyl ester (FAME) are mixed, or in the case where the fatty acid methyl ester (FAME) and the A heavy oil (MDO) are mixed, the CPU 49 also computes mixture ratios of the fuel oils that satisfy the predetermined viscosity condition and, at the same time, maximizes the content of the fuel oil having the highest viscosity, which is considered to be most advantageous in terms of cost.

Next, the CPU 49 simultaneously reads out from the ROM 50 a plurality of types of reference maps that show the relationship between the mixture ratios and the fuel prices for the combinations of the fuel oils corresponding to each fuel map. Referring to the reference maps, the CPU 49 executes various computations related to the prices of the oil mixture of the mixture ratios of the fuel oils computed at step S13. The CPU 49 then shows the computation results on a display screen (not shown) provided in the input device 53.

Subsequently, based on the displayed contents of the computation results, the operator decides the fuel oils that are mixed to generate the oil mixture. When the operator inputs the decision result using the input device 53, the CPU 49 determines, in accordance with the operator's decision, the combination and the mixture ratios of the fuel oils used as the materials of the oil mixture (step S15). Therefore, in the present embodiment, step S15 corresponds to mixture ratio setting step. The CPU 49 switches the valve states of the three-way valves 15, 18, 21 to generate an oil mixture having the determined combination and mixture ratios of the fuel oils in the blender 13, and controls the operating states of the pressurizing pumps 17, 20. The CPU 49 supplies to the engine 14 the oil mixture that has been stored in the oil mixture tank 27 by the operation of the pressurizing pump 32, thereby starting the operation of the engine 14. That is, the CPU 49 starts a mixing step.

After starting the operation of the fuel supply apparatus 11 and the engine 14, the CPU 49 detects the viscosity of the oil mixture at predetermined intervals based on a detection signal of the viscometer 33 (step S16). That is, the CPU 49 performs a viscosity detecting step. Subsequently, the CPU 49 determines whether the detected viscosity (MV) of the oil mixture detected at step S16 is lower than a threshold value (set viscosity) of the viscosity condition (SV) set at step S10 (step S17). Immediately after the operation of the fuel supply apparatus 11 is started, the fuel oils are stored in the fuel tanks 12a to 12c at normal temperature. Accordingly, the oil mixture generated by mixing such fuel oils is also approximately at a room temperature.

However, as the fuel supply apparatus 11 operates, the temperature of the engine 14, which functions as a drive source, increases. Accordingly, the piping of the fuel supply apparatus 11 (including the supply passages 16, 19, 22, 31, 36) is heated by the exhaust heat of the engine 14. Therefore, the oil mixture, which is supplied to the engine 14 through the heated supply passages, is also heated. In this case, the heated temperature is lower than a temperature obtained by direct heating using heating means such as a heater, and is not as high as to cause degradation of the fuel oils due to oxidation. An increase of the temperature of the oil mixture when it is indirectly heated can change the optimum condition of the mixture ratios of the fuel oils in the oil mixture, which optimum condition satisfies the viscosity condition (SV) set at step S10.

Therefore, at step S17, the CPU 49 compares the viscosity (MV) of the oil mixture detected after the operation of the fuel supply apparatus 11 is started with a threshold value of the viscosity condition (SV) of the oil mixture set in advance, thereby determining whether the mixture ratios of the fuel oils in the oil mixture are in the optimum condition.

The flow of the supplied oil mixture will now be described. Some of the oil mixture supplied to the engine 14 is returned to the return chamber 30 after being heated by the exhaust heat of the engine 14. Then, the returned oil mixture is mixed with the oil mixture that is supplied from the oil mixture tank 27 through the return chamber 30. In this case, the CPU 49 functions as mixture ratio adjusting means that adjusts the mixture ratios of the fuel oils in the oil mixture set at step S13, such that the content of the fuel oil having the highest viscosity among the fuel oils in the oil mixture is maximized. That is, the adjusting means performs an adjusting step. The adjusting step will hereafter be described.

If the determination at step S17 is positive (that is, SV=MV), the CPU 49 determines that the mixture ratios of the fuel oils in the oil mixture supplied to the engine 14 are in the optimum condition, and continues operating the engine 14 while maintaining the conditions related to the mixture ratios of the fuel oils in the oil mixture.

In contrast, if the determination at step S17 is negative (that is, SV≠MV), the CPU 49 determines that the mixture ratios of the fuel oils in the oil mixture supplied to the engine 14 are not in the optimum condition, and changes the mixture ratios of the fuel oils in the oil mixture in the following manner (step S18).

First, a case will be described in which, as the result of indirect heating of the oil mixture by the exhaust heat of the engine 14 as described above, the viscosity (MV) of the oil mixture detected at step S16 falls below the predetermined viscosity condition (SV). In this case, the CPU 49 refers to the fuel map read out at step S12 and selects a graph of the temperature condition that corresponds to the temperature of the oil mixture based on the viscosity and mixture ratios at the time. Then, the CPU 49 refers to the graph and computes mixture ratios of the fuel oils that satisfy the viscosity condition of the oil mixture set in advance, and maximize the content of the high viscosity fuel oil in the fuel oils. Based on the computation results, the CPU 49 changes the mixture ratios of the fuel oils in the oil mixture. In this case, the mixture ratios are changed such that the content of the high viscosity fuel oil in the fuel oils is further increased.

In contrast, when the temperature of the oil mixture drops due to, for example, radiation of the heat of the oil mixture to the atmosphere via supply passages while being supplied to the engine 14, the viscosity of the oil mixture increases. If the viscosity (MV) of the oil mixture detected at step S16 exceeds the threshold value of the viscosity condition (SV) set in advance, the mixture ratios are changed in the following manner. That is, in this case, the CPU 49 refers to the fuel map and selects on the fuel map a graph of the temperature condition that corresponds to the temperature at the time of the oil mixture. Then, the CPU 49 refers to the graph and computes mixture ratios of the fuel oils that satisfy the viscosity condition of the oil mixture set in advance, and maximize the content of the high viscosity fuel oil in the fuel oils. Based on the computation results, the CPU 49 changes the mixture ratios of the fuel oils in the oil mixture. In this case, the mixture ratios are changed such that the content of the high viscosity fuel oil in the fuel oils is reduced.

Thereafter, the CPU 49 continues the operation of the engine 11 while applying the mixture ratios of the fuel oils in the oil mixture that have been changed at step S18. When the operation of the fuel supply apparatus 11 is stopped, the fuel supply control processing routine is finished.

The present embodiment has the following advantages.

(1) The initial values of mixture ratios of an oil mixture generated by mixing various types of fuel oils having different viscosities (vegetable oil, fatty acid methyl ester, and A heavy oil) are set by the input device 53. The viscosity of the oil mixture supplied to the engine 14 is detected by the viscometer 33. The mixture ratios of the fuel oils in the oil mixture are adjusted such that the detected viscosity (MV) of the oil mixture satisfies the viscosity condition (SV) of the oil mixture that has been set by the input device 53, and the content of the fuel oil having the highest viscosity among the fuel oils of the oil mixture is maximized. Therefore, the viscosity of the oil mixture can be adjusted without resorting to heating of the oil mixture, which would degrade the fuel oil due to oxidation. Also, since the mixture ratios of the fuel oils in the oil mixture are adjusted to maximize the content ratio of the high viscosity fuel oil, it is possible to maximize the use of the high viscosity fuel oil, which is generally considered to be advantageous the price.

(2) The ROM 50 stores the fuel maps, each of which defines the relationship between the viscosity of the oil mixture generated by mixing the fuel oils and the mixture ratios of the fuel oils for generating the oil mixture of the viscosity for each temperature condition of the oil mixture. Thus, it is possible to compute mixture ratios of the fuel oils that satisfy the predetermined viscosity condition of the oil mixture based on the fuel maps.

(3) The ROM 50 stores a plurality of types of reference maps that show the relationship between the mixture ratios and the fuel prices for the combinations of the fuel oils corresponding to each map. Therefore, the fuel price of the oil mixture at the mixture ratios of the fuel oils, which have been computed based on the fuel map referring to the reference map, is computed. Based on the computation result, an optimal combination can be selected from a number of combinations of the fuel oils by taking into consideration the fuel supply costs.

(4) Some of the oil mixture supplied to the engine 14 is circulated through the return chamber 30, so as to be mixed with the oil mixture supplied from the oil mixture tank 27. Since the oil mixture supplied to the engine 14 is heated by exhaust heat, the content ratio of the high viscosity fuel oil among the fuel oils in the oil mixture can be raised further.

(5) The first and second flow regulating valves 23, 24 in the blender 13 are controlled based on the detection results of the first and second flow meters 25, 26. This allows the mixture ratios of the fuel oils (vegetable oil, fatty acid methyl ester, and A heavy oil) mixed in the blender 13 to be adjusted. Therefore, the mixture ratios of the oil mixture can be adjusted by a simple structure.

The above described embodiment may be modified as follows.

The circulating means for circulating some of the oil mixture supplied to the engine 14 may be omitted.

Instead of the use of the flow regulating valves 23, 24, the flow regulating means may be formed by adjusting the operating time of the pressurizing pumps 17, 20 based on the results of the flow rate detected by the flow meters 25, 26. In this case, the flow regulating valves 23, 24 may be omitted.

The threshold value of the viscosity condition, which is used as a criterion for determining whether the mixture ratios of the fuel oils in the oil mixture are optimum conditions, does not need to be set to a specific value, but may be a range having a certain width.

Instead of being connected to the second three-way valve 18, the downstream end of the supply passage 22 may be directly inserted into the blender 13. In this case, additional pressurizing pump, flow regulating valve, and flow meter may be provided in the inserted portion of the supply passage 22.

The reference map stored in the ROM 50 together with the fuel maps may be replaced by a map that does not show the relationship between the mixture ratios and the fuel prices as long as it defines the relationship between the mixture ratios and the fuel supply cost. For example, a map that defines the relationship between the mixture ratios and the amount of carbon dioxide emissions may be used. That is, since the costs of equipment for reducing the amount of carbon dioxide emissions are indirectly reflected on the fuel supply cost, a map that defines the relationship between the mixture ratios and the amount of carbon dioxide emissions is regarded as a map that shows the mixture ratios and the fuel supply cost.

The fuel maps may be stored in an external storage device and read by the control device 48 as necessary.

The vegetable oil, which is the fuel oil stored in the first fuel tank 12a, may be, for example, palm oil, rapeseed oil, soybean oil, or sunflower seed oil.

The fatty acid methyl ester, which is the fuel oil stored in the second fuel tank 12b, may be replaced by an oil that has a fatty acid methyl ester composition obtained through the methyl esterification of the above described vegetable oil, an animal oil such as a fish oil, and edible oil waste of these oils, by an alkali catalyst method or an oxygen method.

The A heavy oil, which is used the fuel oil stored in the third fuel tank 12c, may be replaced by, for example, Kerosene, a light oil, a B heavy oil, or a C heavy oil.

The fuel oils stored in the fuel tanks 12a to 12c may be two or more types of oils other than the fuel oils shown above (the vegetable oil, the fatty acid methyl ester, the A heavy oil), as long as the combination includes a heat resistant fuel oil and a non-heat resistant fuel oil.

The invention claimed is:

1. A fuel supply apparatus comprising:
   a flow regulator that sets mixture ratios of fuel oils, which are arbitrarily combined and mixed to generate an oil mixture, in accordance with a predetermined viscosity condition;
   a blender that mixes the plurality of types of fuel oils based on the mixture ratio set by the flow regulator, thereby generating the oil mixture;
   viscosity detector, configured for detecting a viscosity of the oil mixture generated by the blender; and
   a controller that adjusts the mixture ratios of the fuel oils in the oil mixture that have been set by the flow regulator based on a detection result of the viscosity detector, such that the viscosity of the oil mixture satisfies the viscosity condition and that the content of a fuel oil having the highest viscosity among the fuel oils in the oil mixture is maximized.

2. The fuel supply apparatus according to claim 1, comprising:
   temperature sensor that detects a temperature of each fuel oil prior to the generation of the oil mixture; and
   memory, configured for storing one or more fuel maps each defining the relationship between a viscosity of the oil mixture and mixture ratios of the fuel oils at each of different temperatures of the oil mixture; and
   wherein the flow regulator sets the mixture ratios of the fuel oils in the oil mixture based on the detection result of the temperature sensor and the fuel maps stored in the memory.

3. The fuel supply apparatus according to claim 2, wherein the one or more fuel maps stored in the memory include a plurality of types of fuel maps each corresponding to a different combination of the fuel oils that are mixed to generate an oil mixture satisfying the viscosity condition, and
   wherein the memory further stores a reference map that defines the relationship between mixture ratios and fuel supply costs for a combination of the fuel oils corresponding to the fuel maps.

4. The fuel supply apparatus according to claim 1, comprising:
   a drive source that receives oil mixture as fuel from the blender through a supply passage; and
   a circulator that is located in the supply passage and between the mixing means and the drive source, the circulator circulating some of the oil mixture supplied to the drive source to an upstream part of the supply passage,
   wherein the controller adjusts the mixture ratios of the oil mixture based on a viscosity of the oil mixture detected by the viscosity detector after the drive source is started.

5. The fuel supply apparatus according to claim 1, comprising:
   a plurality of fuel tanks each storing different one of the fuel oils; and
   flow regulator located between the fuel tanks and the blender, wherein the flow regulator regulates the flow rate of each fuel oil so as to supply the plurality of types of fuel oils to the blender, the flow regulator controlling the mixture ratios of the oil mixture.

6. A fuel supply method using a fuel supply apparatus, the method comprising:

a mixture ratio setting step including setting mixture ratios of fuel oils, which are arbitrarily combined and mixed to generate an oil mixture, in accordance with a predetermined viscosity condition;

an oil mixture generating step including mixing the plurality of types of fuel oils based on the mixture ratio set in the mixture ratio setting step, thereby generating the oil mixture;

viscosity detecting step including detecting a viscosity of the oil mixture generated in the mixing step; and adjusting step including adjusting the mixture ratios of the fuel oils in the oil mixture that have been set in the mixture ratio setting step based on a detection result of the viscosity detecting step, such that the viscosity of the oil mixture satisfies the viscosity condition and that the content of the fuel oil having the highest viscosity among the fuel oils in the oil mixture is maximized.

7. The apparatus of claim 1, wherein the viscosity detector comprises a temperature sensor.

8. The apparatus of claim 1, wherein the viscosity detector comprises a viscometer.

9. A fuel supply apparatus comprising:

mixture ratio setting means that sets mixture ratios of fuel oils, which are arbitrarily combined and mixed to generate an oil mixture, in accordance with a predetermined viscosity condition;

mixing means that mixes the plurality of types of fuel oils based on the mixture ratio set by the mixture ratio setting means, thereby generating the oil mixture;

viscosity detecting means for detecting a viscosity of the oil mixture generated by the mixing means; and adjusting means that adjusts the mixture ratios of the fuel oils in the oil mixture that have been set by the mixture ratio setting means based on a detection result of the viscosity detecting means, such that the viscosity of the oil mixture satisfies the viscosity condition and that the content of a fuel oil having the highest viscosity among the fuel oils in the oil mixture is maximized.

10. The fuel supply apparatus according to claim 1, further comprising:

temperature detecting means that detects a temperature of each fuel oil prior to the generation of the oil mixture; and memory means for storing one or more fuel maps each defining the relationship between a viscosity of the oil mixture and mixture ratios of the fuel oils at each of different temperatures of the oil mixture; and wherein the mixture ratio setting means sets the mixture ratios of the fuel oils in the oil mixture based on the detection result of the temperature detecting means and the fuel maps stored in the memory means.

11. The fuel supply apparatus according to claim 2, wherein the one or more fuel maps stored in the memory means include a plurality of types of fuel maps each corresponding to a different combination of the fuel oils that are mixed to generate an oil mixture satisfying the viscosity condition, and wherein the memory means further stores a reference map that defines the relationship between mixture ratios and fuel supply costs for a combination of the fuel oils corresponding to the fuel maps.

12. The fuel supply apparatus according to claim 9, further comprising:

a drive source that receives oil mixture as fuel from the mixing means through a supply passage; and circulating means that is located in the supply passage and between the mixing means and the drive source, the circulating means circulating some of the oil mixture supplied to the drive source to an upstream part of the supply passage, wherein the adjusting means adjusts the mixture ratios of the oil mixture based on a viscosity of the oil mixture detected by the viscosity detecting means after the drive source is started.

13. The fuel supply apparatus according to claim 9, further comprising:

a plurality of fuel tanks each storing different one of the fuel oils; and flow regulating means located between the fuel tanks and the mixing means, wherein the flow regulating means regulates the flow rate of each fuel oil so as to supply the plurality of types of fuel oils to the mixing means, the flow regulating means controlling the mixture ratios of the oil mixture.

* * * * *

UNITED STATES PATENT AND TRADEMARK OFFICE
CERTIFICATE OF CORRECTION

PATENT NO. : 8,584,657 B2  
APPLICATION NO. : 12/742410  
DATED : November 19, 2013  
INVENTOR(S) : Yagi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 857 days.

Signed and Sealed this
Twenty-second Day of September, 2015

Michelle K. Lee
*Director of the United States Patent and Trademark Office*